Sept. 27, 1938.  C. P. WINTER  2,131,247
CHANGE SPEED MECHANISM
Filed Dec. 15, 1937  3 Sheets-Sheet 1

Sept. 27, 1938.   C. P. WINTER   2,131,247
CHANGE SPEED MECHANISM
Filed Dec. 15, 1937   3 Sheets-Sheet 3

Area under tension
Area under compression

Inventor
C. P. Winter,
By Barry & Cyr.
Attorneys

Patented Sept. 27, 1938

2,131,247

UNITED STATES PATENT OFFICE 2,131,247

CHANGE SPEED MECHANISM

Courtney P. Winter, Chambersburg, Pa.

Application December 15, 1937, Serial No. 180,015

6 Claims. (Cl. 74—230.17)

This invention relates to improvements in change speed mechanism and more especially to power transmissions of the type employing V-belts and axially shiftable discs or variable pulleys.

In the manufacture of pulleys for V-belts, it is standard practice to alter the angles of the inner or friction surfaces to correspond with the effective diameter of the pulley; the smaller the pulley, the nearer parallel are the inner walls or friction surfaces. This has a detrimental effect on the belt as the width of the belt tends to vary as it passes around the pulley. For example, when the belt is flexed around a small pulley, its outer portion tends to narrow as it is under tension, and its inner portion tends to widen as it is under compression. This results in decreased efficiency and increases wear on the belt. In order to overcome this tendency, I have discovered that the friction surfaces of variable diameter pulleys should vary in angle with the effective diameter as this increases the efficiency and decreases wear on the belt. It is therefore an object of my invention to provide in change speed mechanism of the V-belt type, a variable pulley having friction surfaces which vary in angle with the effective diameter of the pulley. This is accomplished by making the friction surfaces of substantially dome shape or with suitable curvatures.

Another purpose of the invention is to provide a change speed mechanism of this type which may be efficiently lubricated without liability of the lubricant reaching the belts and interfering with or causing deterioration of the latter. As my construction is such that the lubricant cannot reach the belts, it will be obvious that the belts will always frictionally engage the discs with sufficient tenacity to prevent any slipping of the belts relatively to the discs.

A further object is to furnish a change speed mechanism of the V-belt disc type which is of simple construction, inexpensive to manufacture and which will last indefinitely without requiring repair or replacement.

The invention may be carried out in various ways, but one construction according thereto is illustrated by way of example in the drawings, in which Fig. 1 is a side elevation of my improved mechanism.

Figure 3:
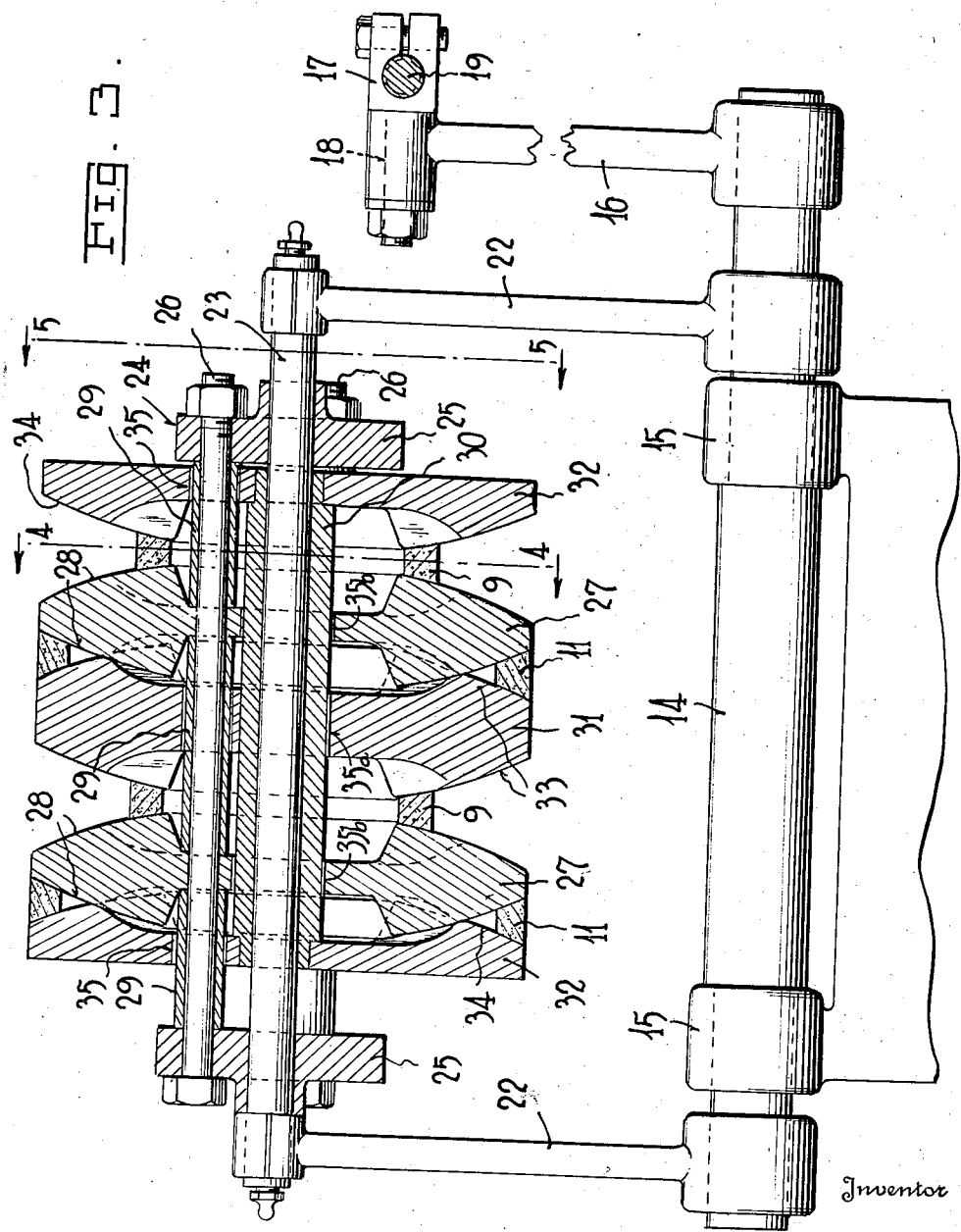
Fig. 3 is an enlarged vertical section view of the disc assembly of the mechanism.
Figure 4:
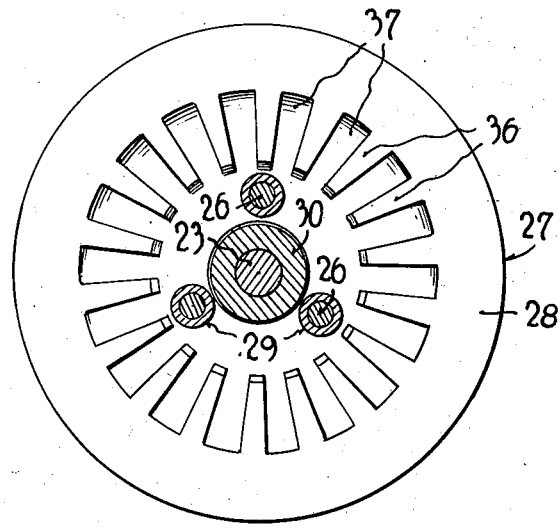
Figure 5:
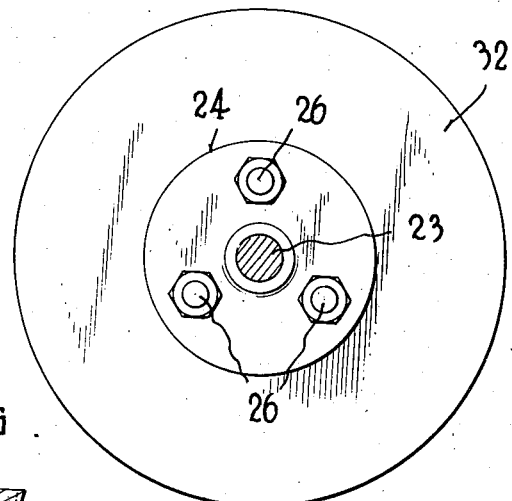

Figs. 4 and 5 are sectional views taken respectively on lines 4—4 and 5—5 of Fig. 3.

Figure 6:
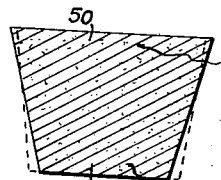

Fig. 6 is a cross section of one of the belts diagrammatically illustrating what happens when it is flexed about a small pulley.

Referring to the drawings, 6 designates any suitable form of power unit, such as an electric motor, or other means for driving a shaft 7, which, for illustrative purposes, is provided with a plurality of V pulleys 8 that are fixed thereto. The pulleys drive a pair of V-belts 9 which drive the disc unit 10 of the change speed mechanism. Another pair of V-shaped transmission belts 11 are driven by the disc unit and serve to drive a pulley 12 on the driven shaft 13 which may be rotated at an infinite number of speeds through the instrumentality of the disc assembly.

Referring now to such assembly, which really forms the novelty of the present invention, and which is best illustrated in Figs. 3 to 5 inclusive, 14 designates a rock shaft journaled in bearings 15 on the frame of the machine. The shaft may be controlled by any suitable means. For instance, it may be provided with an arm 16, fixed thereto and carrying a nut 17 that is pivotally connected to the arm as indicated at 18. A screw 19 is in threaded engagement with the nut and has a swivel connection at 20 (Fig. 1) with the frame of the machine, and such screw is provided with a hand wheel 21 by means of which the screw may be turned for rocking the shaft 14.

Other arms 22 are fixed to the shaft 14 and support an auxiliary shaft 23 on which is mounted an axially shiftable frame 24. The latter preferably consists of end plates 25 connected together by bolts 26. There are preferably three of these bolts as indicated in Figs. 4 and 5 and they support a pair of discs 27, each of which has opposite annular curved surfaces 28 which vary in angle with the effective diameter of the discs. These discs are held in spaced rigid relation relatively to one another and to the plates 25 by means of spacing sleeves 29 which surround the bolts 26. The entire assembly consisting of the parts 24 to 29 inclusive, is adapted to move as a unit axially along the auxiliary shaft 23.

Another sleeve 30 surrounds the shaft 23 and is axially slidable and rotatably mounted thereon and this sleeve is fixed to a central disc 31 and end discs 32; the central disc being secured to the sleeve by a key 35a. The disc 31 is similar in shape to each of the discs 27, i. e., the disc 31 has opposite annular curved surfaces 33 which vary in angle with the effective diameter of the disc. Each of the end discs has only a single annular curved side surface 34 and the curved surfaces of the end discs face each other, as shown in Fig. 3.

The central disc 31 and the end discs 32 are provided with apertures 35 to permit the passage of the sleeves 29 without contacting the latter and to allow the assembly consisting of the parts 30 to 34 inclusive to move axially along the sleeves 29 without friction.

The discs 27 are provided at their centers with apertures 35b of larger diameter than the sleeve 30 to permit relative movement between these parts, without friction.

The central portions of the discs, as best shown in Fig. 4, are provided with alternate radial teeth 36 and radial recesses 37, and these are arranged in staggered relation on opposed discs so that the teeth of one will mesh with the recesses of an adjacent disc when one set of discs is moved toward the other.

Figure 1:
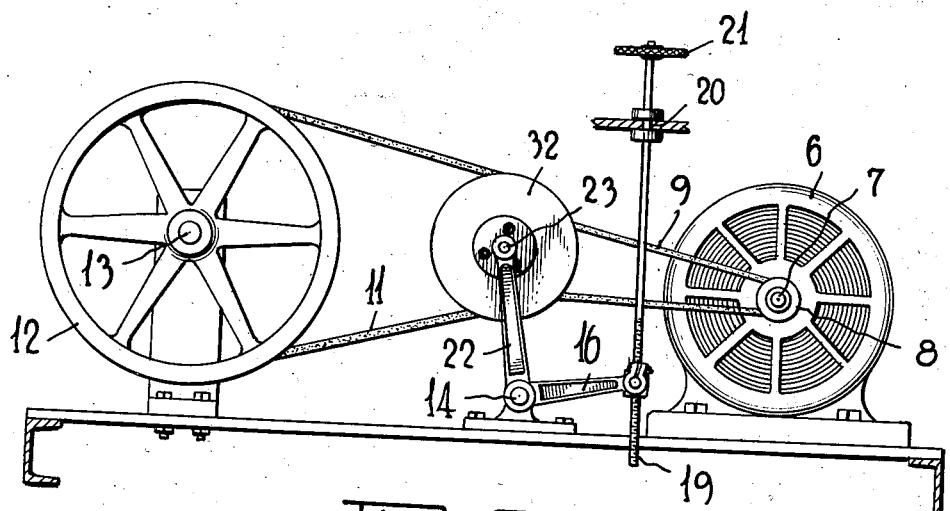
Figure 2:
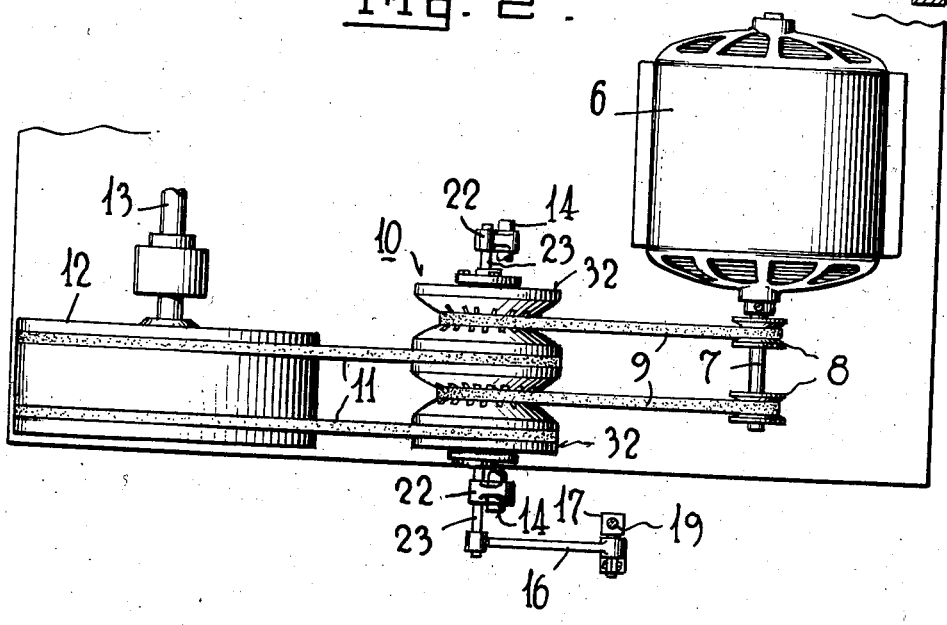
Fig. 2 is a top plan view partly broken away to facilitate illustration.

In Figs. 1 to 3 inclusive, it will be noted that the V-type belts 11 engage certain of the discs near the peripheral portions of the latter while the similar belts 9 engage central portions of certain of the discs. However, if the arms 22 are shifted in a clockwise direction (Fig. 1), it is obvious that the belts 11 will act to force the discs 31, 32 toward the left (Fig. 3) and to force the discs 27 toward the right, whereby the belts 9 will tend to move toward the periphery of the discs while the bolts 11 will tend to move toward the shaft 23 and thus effect a change of speed between shafts 7 and 13.

Although all the parts mounted on the shaft 23 will be rotated about that shaft, and the latter may be lubricated by any suitable means, it will be manifest that the sleeve 30 will prevent any lubricant from reaching any of the surfaces between the end discs 32, and consequently the mechanism may be used indefinitely without liability of fouling the belts or the curved surfaces of the discs.

In Fig. 6, I have diagrammatically illustrated what takes place when a V-type belt is flexed around a small pulley. At such time the outer portion 50 of the belt is under tension while the inner portion 51 is under compression. Consequently, the cross section of the belt tends to assume the dotted line shape shown in this figure. To compensate for such variation, I have made the friction surfaces curved or varying in angle with the effective diameters of the pulleys thus formed. This increases efficiency and decreases wear on the belts.

The herein described and illustrated embodiment has given satisfactory results, and it will be manifest to those skilled in the art, after an understanding of the invention, that other changes and modifications may be made without departing from the spirit and scope of the invention, and it is intended that all matters contained in the above description or shown in the drawings shall be interpreted as illustrative and not in a limiting sense.

What I claim and desire to secure by Letters Patent is:

1. A V-type belt pulley unit comprising a shaft, a sleeve rotatably mounted on and axially shiftable along said shaft, first apertured discs fixed to said sleeve and spaced from one another, supporting members rotatably and slidably mounted on the shaft outwardly of the ends of the sleeve and movable toward and away from said discs, means connecting said supporting members, said connecting means having portions of materially less diameter than the apertures of the discs and extending through said apertures to prevent any friction due to relative movement between the discs and connecting means, and an apertured second disc supported by the connecting means and arranged between the first discs, said sleeve being of materially less diameter than the aperture of the second disc and extending through the aperture of the second disc to prevent friction due to relative movement between the second disc and the sleeve, said discs having opposed inclined surfaces adapted to engage V-type belts.

2. A V-type belt pulley unit comprising a shaft, a sleeve rotatably mounted on and axially shiftable along said shaft, a first apertured disc fixed to said sleeve, supporting members rotatably and slidably mounted on the shaft outwardly of the ends of the sleeve and movable toward and away from said disc, means connecting said supporting members and having portions of materially less diameter than the apertures of the disc and extending through said apertures to prevent any friction due to relative movement between the disc and the connecting means, and second apertured discs supported by the connecting means and arranged at opposite sides of the first disc, said sleeve being of materially less diameter than the apertures of the second discs and extending through the apertures in the second discs to prevent friction due to relative movement between the second discs and the sleeve, said discs having opposed inclined surfaces adapted to engage V-type belts.

3. A V-type belt pulley unit comprising a shaft, a sleeve rotatably mounted on and axially shiftable along said shaft, first apertured discs fixed to said sleeve and spaced from one another, end plates rotatably and slidably mounted on the shaft outwardly of the ends of the sleeve and movable toward and away from said discs, means connecting said supporting members and having portions of materially less diameter than the apertures of the discs and extending through said apertures to prevent any friction due to relative movement between the discs and the connecting means, and a second apertured disc supported by the connecting means and arranged between the first discs, said sleeve being of materially less diameter than the aperture of the second disc and extending therethrough to prevent friction due to relative movement between the second disc and the sleeve, said discs having opposed inclined surfaces adapted to engage V-type belts.

4. A V-type belt pulley unit comprising a shaft, a sleeve rotatably mounted on and axially shiftable along said shaft, first apertured discs fixed to said sleeve and spaced from one another, supporting members rotatably and slidably mounted on the shaft outwardly of the ends of the sleeve and movable toward and away from said discs, means including bolts connecting said supporting members, said means having portions of materially less diameter than the apertures of the discs and extending through said apertures to prevent any friction due to relative movement between the discs and the connecting means, and a second apertured disc supported by the connecting means and arranged between the first discs, said sleeve being of materially less diameter than the aperture of the second disc and extending therethrough to prevent friction due to relative movement between the second disc and the sleeve, said discs having opposed inclined surfaces adapted to engage V-type belts.

5. A V-type belt pulley unit comprising a shaft, a sleeve rotatably mounted on and axially shiftable along said shaft, an apertured first disc fixed to said sleeve, supporting members rotatably and slidably mounted on the shaft outwardly of the ends of the sleeve and movable toward and away from said disc, rod-like means of materially less diameter than the apertures of the disc, connecting said supporting members and extending through said apertures to prevent any friction due to relative movement between the disc and the connecting means, second apertured discs supported by the connecting means and arranged at opposite sides of the first disc, said sleeve being of materially less diameter than the apertures of the second discs and extending therethrough to prevent friction due to relative movement between the second discs and the sleeve, said discs having opposed inclined surfaces adapted to engage a V-type belt.

6. A V-type belt pulley unit comprising a shaft, a sleeve rotatably mounted on and shiftable along said shaft, first apertured discs fixed to said sleeve and spaced from one another, supporting means rotatably and slidably mounted on the shaft outwardly of the ends of the sleeve and movable toward and away from said discs, means including bolts and spacing collars connecting said supporting members, said connecting means being of materially less diameter than the apertures of said discs and extending therethrough to prevent any friction due to relative movement between the discs and the connecting means, and a second apertured disc rigidly connected with and supported by the connecting means and arranged between the first discs, said sleeve being of materially less diameter than the aperture of the second disc and extending therethrough to prevent friction due to relative movement between the second disc and the sleeve, said discs having opposed inclined surfaces adapted to engage V-type belts.

COURTNEY P. WINTER.